March 23, 1954  R. E. CROSS ET AL  2,672,789
CUTTER DRIVER FOR MACHINE TOOLS
Filed Dec. 13, 1950
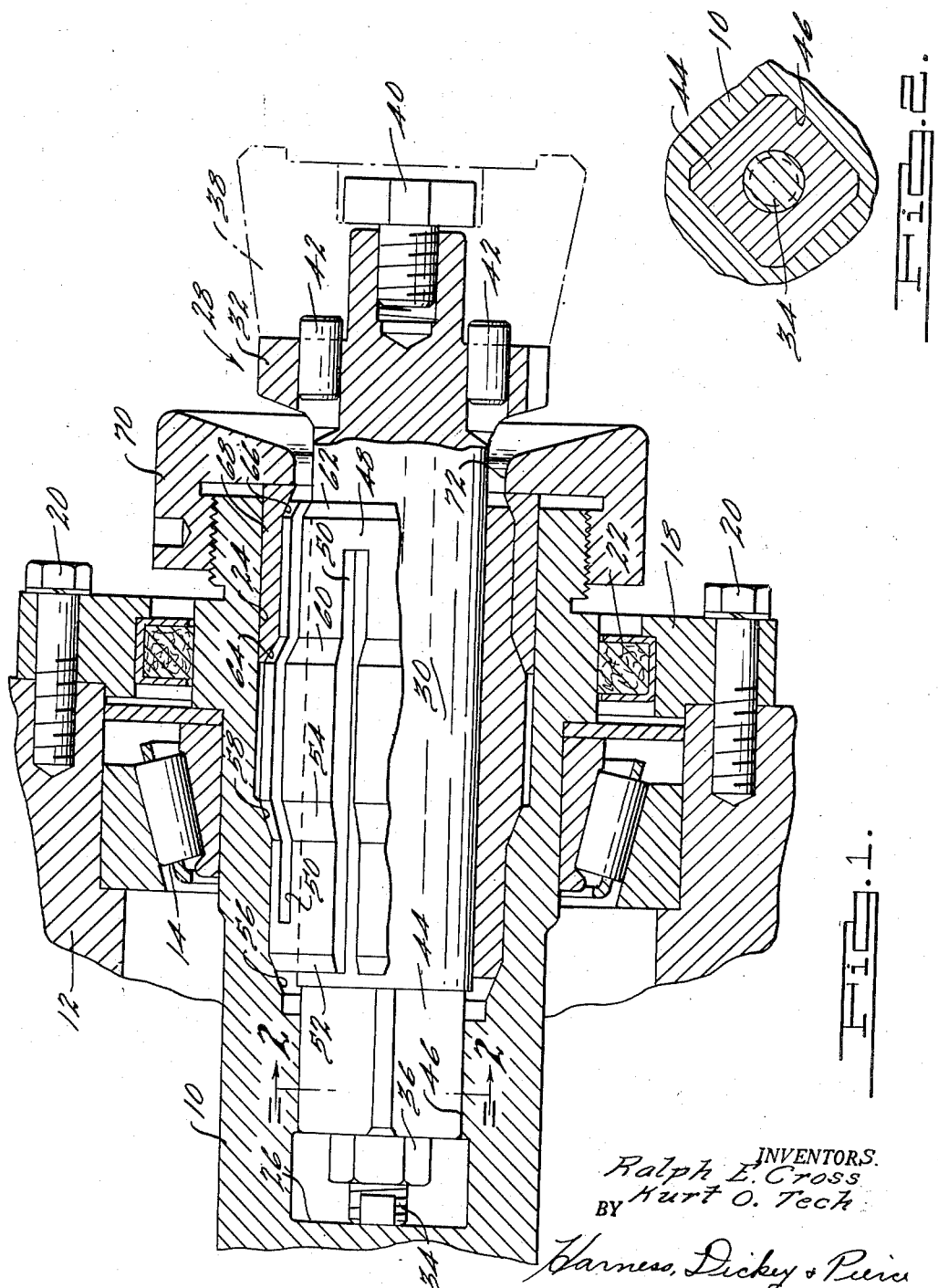
INVENTORS.
Ralph E. Cross
BY Kurt O. Tech
Harness, Dickey & Pierce
ATTORNEYS.

Patented Mar. 23, 1954

2,672,789

UNITED STATES PATENT OFFICE 2,672,789

CUTTER DRIVER FOR MACHINE TOOLS

Ralph E. Cross, Grosse Pointe Shores, and Kurt O. Tech, East Detroit, Mich.; said Tech assignor to said Cross Application December 13, 1950, Serial No. 200,598

7 Claims. (Cl. 90—11)

This invention relates broadly to new and useful improvements in machine tools and more particularly to an improved mounting for cutter drivers of the type adapted to carry face-milling cutters, boring cutters and the like.

When mounting a face-milling cutter in a milling machine to obtain a desired depth of cut, it has heretofore been the conventional practice to first set the cutter to an approximate dimension, then take a trial cut, and then adjust the cutter according to the results of the trial cut. Several trial cuts frequently are necessary before the cutter is properly positioned for operation. Manifestly, this procedure is tedious and time-consuming and an excessive amount of scrap is produced as a result of the trial cuts. Inasmuch as the cutters must be changed at frequent intervals and the machine necessarily is out of operation while the cutters are being changed, the time required to change cutters represents a considerable loss of valuable production time.

An important object of the present invention is to provide a mounting for milling cutters and the like that greatly facilitates and expedites the operation of changing and locating cutters in the machine.

Another object of the invention is to provide a mounting for milling cutters and the like that eliminates the necessity of making trial cuts heretofore required in the initial adjustment of the cutter.

Other objects and advantages of the invention will be apparent during the course of the following description.

In the drawing forming a part of this specification and wherein like numerals are employed to designate like parts throughout the same, Fig. 1 is a fragmentary view showing parts in section and parts in elevation of the mounting embodying the instant invention, and Fig. 2 is a fragmentary, transverse sectional view taken on the line 2—2 of Fig. 1.

In the drawing, wherein for the purpose of illustration is shown a preferred embodiment of the invention, the numeral 10 designates a spindle mounted for rotation in and carried by a suitable support 12. The forward end of the spindle is here shown supported for rotation by a roller bearing 14. The spindle 10 extends forwardly of the support 12 and through a retaining cap 18 fastened to the support 12 by bolts 20. The cap 18 is spaced radially from the spindle 10, and the joint therebetween is closed by a conventional oil seal 22.

According to the present invention, the spindle 10 is provided in the forward end thereof with a socket 24 which receives the cutter driver hereinafter described in detail. The bottom 26 of the socket 24 defines a reference surface which seats the rearward end of the cutter-driver assembly and thus determines the axial position of the cutter. By using the bottom 26 as a reference surface, it is possible to preadjust the cutter-driver assembly before mounting the same on the machine to obtain an accurate depth of cut and without the necessity of further adjusting the cutter or the cutter holder in the machine. In this manner, the time required to change cutters and production time heretofore lost in changing cutters is materially reduced.

More particularly, the cutter-driver assembly comprises a cutter driver 28 having a shank portion 30 and a head portion 32 on the forward end of the shank. As clearly shown in the drawing, the shank 30 extends into the socket 24 and an axially adjustable screw 34 threaded into the rearward end of the shank seats against the reference surface 26. A lock nut 36 holds the screw 34 in a selected adjusted position. A cutter, such as the face-milling cutter 38, shown in broken lines in Fig. 1 is fastened to the head 32 by a screw 40. Pins 42 carried by the head 32 and projecting into suitable openings or recesses in the rear face of the cutter 38 provide a direct rotary drive between the head and the cutter.

By reason of this construction the total length of the assembly can be varied within limits defined by the full adjustment of screw 34. In this manner the length of the cutter-drive assembly can be accurately adjusted while the assembly is out of the machine, and since the screw 34 seats against the reference surface 26, the distance the cutter extends from the machine can be accurately determined. In this manner it is possible to position the cutter exactly for a desired depth of cut without first making trial or experimental cuts.

Any suitable means can be provided for establishing a direct rotary drive between the spindle 10 and the cutter driver 28, but we have found that this can be done most conveniently by providing the shank 30 with a square terminal portion 44 which extends into and snugly fits a correspondingly shaped side wall portion 46 of the socket 24.

In order to hold the cutter driver 28 centered properly in coaxial relation with respect to the spindle 10, a collet 48 is provided around the shank 30 in the forward portion of socket 24. The particular collet here shown is generally in the form of an elongated sleeve having a plurality of circumferentially spaced longitudinal slots 50. The slots 50 extend alternately from opposite ends of the collet and each slot extends substantially entirely through the collet so that the latter is readily expansible and contractible. The inner or rearward half of the collet 48 is formed with a pair of rearwardly tapered external bearing surfaces 52 and 54 which seat solidly against correspondingly tapered seats 56 and 58 respectively formed in the wall of socket 24. The outer or forward half of the collet 48 is similarly formed with forwardly tapered bearing surfaces 60 and 62 which engage correspondingly tapered seats 64 and 66 provided in a ring-shaped wedge 68 which fits snugly in the socket 24 and around the forward portion of the collet 48. It will be observed that the wedge 68 extends forwardly of the spindle 10 and a nut 70 threaded on the forward end of the spindle seats rearwardly against the projecting end of the wedge. The cutter driver 28 extends through an opening 72 provided centrally in the nut 70.

When the nut 70 is loosened on the spindle 10 the inherent resiliency of the collet 48 forces the wedge 68 forwardly and permits the collet to expand and release the shank portion 30 of the cutter driver 28. When the collet 48 is expanded, the cutter-driver assembly can be easily removed from the spindle 10 by pulling it axially forwardly from the socket 24. After the cutter 38 has become worn or dull and the cutter-driver assembly removed from the machine, another identical assembly having a sharp cutter which has been previously adjusted as to length in the manner hereinabove described is inserted in the socket 24 until the screw 34 at the inner end thereof abuts the reference surface 26. After the cutter-driver assembly 28 has been propery bottomed on the reference surface 26, the nut 70 is tightened against the wedge 68 to contract collet 48 solidly against the shank 30 to center the shank properly with respect to the spindle 10.

It may thus be seen that we have achieved the objects of our invention. We have provided a novel cutter-driver assembly and mounting therefor which permits the assembly to be easily removed when the cutter carried thereby becomes dull in use and a new assembly carrying a fresh sharp blade quickly substituted therefor. Moreover, the cutter-driver assemblies can be adjusted as to length out of the machine so that valuable production time need not be used in setting the cutter properly in the machine.

Having thus described the invention, we claim:

1. A machine tool comprising, in combination, a rotatably driven spindle provided with an end socket having a bottom reference surface, axially spaced, outwardly directed, inwardly tapered, annular seats on the side wall thereof, and a noncircular side-wall portion intermediate said reference surface and said seats; a drive shaft having a shank portion extending into said socket and provided with a noncircular portion generally complementing and relatively snugly fitting the noncircular portion of said socket establishing a rotary driving connection between the spindle and the drive shaft; an adjustable member attached to the inner end of said shank portion seating solidly against said reference surface; means holding said adjustable member in a selected adjusted position; a radially expansible and contractible collet in the socket surrounding the shank portion having axially spaced, inwardly tapered, annular bearing surfaces each seating on a respective one of said seats and also axially spaced, outwardly tapered, annular seats; an axially slidable sleeve in and projecting from said socket and disposed around said collet, said sleeve having axially spaced, outwardly tapered bearing surfaces, each seating on a respective one of said last-mentioned seats; and a nut threaded on said spindle engaging the projecting end of said sleeve adapted to be tightened thereagainst to contract the collet on said driver.

2. A machine tool comprising, in combination, a rotatably driven spindle provided with an end socket having a bottom reference surface, and an outwardly directed, inwardly tapered, annular seat on the side wall thereof; a drive shaft having a shank portion extending into said socket; means connecting the spindle and the drive shaft for mutual rotation; an adjustable member attached to the inner end of said shank portion seating solidly against said reference surface; means holding said adjustable member in a selected adjusted position; an expansible and contractible collet in the socket surrounding said shank portion having an inwardly tapered, annular bearing surface seating on said seat and also an outwardly tapered annular seat; an axially slidable sleeve in and projecting from said socket and disposed around said collet, said sleeve having an outwardly tapered bearing surface seating on said last-mentioned seat; and a nut threaded on said spindle engaging the projecting end of said sleeve and adapted to be tightened thereagainst to contract the collet on said driver.

3. A machine tool comprising, in combination, a rotatably driven spindle having an end socket provided with a bottom reference surface and a portion of noncircular cross section; a cutter driver having a shank portion extending into said socket, a portion of said shank complementing and snugly fitting the noncircular portion of said socket to establish a rotary driving connection between the spindle and the driver; an adjustable member attached to the inner end of said shank portion seating solidly against said reference surface; means holding said adjustable member in a selected adjusted position; means for holding said driver centered in said socket including a collet provided in the socket around the shank; and manually operable means coactive with the collet to tighten and loosen the same on the cutter driver.

4. A machine tool comprising, in combination, a rotatably driven spindle having an end socket provided with a bottom reference surface and a portion of noncircular cross section, a member having a shank portion extending into said socket, a portion of said shank complementing and snugly fitting the noncircular portion of said socket to establish a rotary driving connection between the spindle and the member; an adjustable member attached to the inner end of the shank portion seating solidly against said reference surface and positioning said member in a predetermined axial position with respect to the spindle; means holding said adjustable member in a selected adjusted position; and means clamping the shank solidly and holding the same coaxially with respect to the spindle and in said predetermined axially adjusted position.

5. A machine tool comprising, in combination, a rotatably driven spindle having an end socket provided with a bottom reference surface and a portion of noncircular cross section, a member having a shank portion extending into said socket, a portion of said shank complementing and snugly fitting the noncircular portion of said socket to establish a rotary driving connection between the spindle and the member; an adjustable member attached to the inner end of the shank portion seating solidly against said reference surface and positioning said member in a predetermined axial position with respect to the spindle; means holding said adjustable member in a selected adjusted position; means clamping the shank solidly and holding the same coaxially with respect to the spindle and in said predetermined axially adjusted position; means including a collet in the socket and around said shank portion; and manually operable means coactive with the collet to tighten and loosen the same on the shank portion of said member.

6. A machine tool comprising, in combination, a rotatably driven spindle having a radial reference surface; a cutter driver carried by said spindle; means rotatably connecting the spindle and cutter driver while permitting axial movement of the driver relative to the spindle; an adjustable member attached to said cutter driver seating solidly against said reference surface; means holding said adjustable member in a selected adjusted position; and means holding the cutter driver clamped solidly in a centered position in the spindle.

7. A machine tool comprising, in combination, a rotatably driven spindle having a radial reference surface; a removable member carried by the spindle and having a shank portion extending into said spindle; means rotatably connecting the spindle and said shank portion while permitting axial adjustment of the member relative to the spindle; an adjustable member attached to said removable member seating solidly against said reference surface; means holding said adjustable member in a selected adjusted position; and means holding said removable member clamped solidly in a centered position with respect to the spindle and in the axially adjusted position.

RALPH E. CROSS.
KURT O. TECH.

References Cited in the file of this patent

UNITED STATES PATENTS

| Number | Name | Date |
| --- | --- | --- |
| 995,683 | Kearney et al. | June 20, 1911 |
| 1,032,496 | Outterside | July 16, 1912 |
| 1,044,299 | Trundle | Nov. 12, 1912 |
| 1,412,469 | Jimerson | Apr. 11, 1922 |
| 1,434,433 | Ettinger | Nov. 7, 1922 |
| 1,501,465 | Peck | July 15, 1924 |
| 1,839,569 | Lovejoy | Jan. 5, 1932 |
| 1,925,599 | Oesterlein et al. | Sept. 5, 1933 |
| 2,115,058 | Armitage | Apr. 26, 1938 |
| 2,203,943 | Davis | June 11, 1940 |
| 2,501,421 | Stephan | Mar. 21, 1950 |